(12) United States Patent
Bligh et al.

(10) Patent No.: US 8,602,693 B2
(45) Date of Patent: Dec. 10, 2013

(54) METHOD AND APPARATUS FOR CONTROLLING A STREAM OF SOLIDS

(75) Inventors: Roger Bligh, Frankfurt am Main (DE); Pekka Hiltunen, Frankfurt am Main (DE); Cornelis Klett, Koblenz (DE); Michael Missalla, Oberursel (DE); Bernd Reeb, Friedrichsdorf (DE); Lilli Sacharow, Oberursel (DE); Michael Stroeder, Neu-Anspach (DE); Peter Sturm, Karben (DE)

(73) Assignee: Outotec Oyj, Espoo (FI)

( * ) Notice: Subject to any disclaimer, the term of this patent is extended or adjusted under 35 U.S.C. 154(b) by 1004 days.

(21) Appl. No.: 12/529,018

(22) PCT Filed: Jan. 23, 2008

(86) PCT No.: PCT/EP2008/000490
§ 371 (c)(1),
(2), (4) Date: Dec. 10, 2009

(87) PCT Pub. No.: WO2008/104250
PCT Pub. Date: Sep. 4, 2008

(65) Prior Publication Data
US 2010/0118641 A1      May 13, 2010

(30) Foreign Application Priority Data

Feb. 27, 2007   (DE) .......................... 10 2007 009 758

(51) Int. Cl.
*B65G 53/00*    (2006.01)
(52) U.S. Cl.
USPC .............. 406/197; 406/24; 406/136; 406/144

(58) Field of Classification Search
USPC ........................... 406/197, 24, 134, 144, 136
See application file for complete search history.

(56) References Cited

U.S. PATENT DOCUMENTS

| 2,395,106 A | 2/1946 | Day et al. |
| 2,447,043 A | 8/1948 | Welty, Jr. et al. |

(Continued)

FOREIGN PATENT DOCUMENTS

| DE | 1033187  | 7/1958 |
| DE | 19542309 | 5/1997 |

(Continued)

OTHER PUBLICATIONS

International Search Report for PCT/EP2008/000490, mailed on Apr. 8, 2008.

*Primary Examiner* — Joseph Dillon, Jr.
(74) *Attorney, Agent, or Firm* — Leydig, Voit & Mayer, Ltd.

(57) ABSTRACT

A method for controlling at least one of a level of solids and an inventory of solids in a solids tank includes withdrawing a stream of solids from the solids tank via a downer. The stream of solids withdrawn from the solids tank is fluidized at a bottom of the downer by supplying a conveying gas so as to convey the withdrawn stream of solids upward via a riser branching off from the downer, a size of the conveyed stream of solids being adjusted by the supplying of the conveying gas. At least one of the level and the inventory of the solids in the solids tank is used as an adjustment variable of a control circuit and a volume flow of the conveying gas is used as an actuating variable of the control circuit.

12 Claims, 3 Drawing Sheets

(56) References Cited

U.S. PATENT DOCUMENTS

| | | | |
|---|---|---|---|
| 2,601,676 A | 6/1952 | Trainer et al. | |
| 2,751,336 A | 6/1956 | Davis | |
| 2,756,216 A | 7/1956 | Yoder | |
| 2,881,133 A | 4/1959 | Whiteley et al. | |
| 2,978,279 A * | 4/1961 | Bergstrom | 406/94 |
| 3,238,271 A | 3/1966 | Nonnenmacher et al. | |
| 3,378,483 A | 4/1968 | Worrell et al. | |
| 4,036,531 A * | 7/1977 | Rusterholz | 406/50 |
| 4,097,243 A * | 6/1978 | Bartholic | 422/140 |
| 4,327,055 A * | 4/1982 | Luckenbach et al. | 422/223 |
| 4,518,286 A * | 5/1985 | Vaupel et al. | 406/46 |
| 4,525,107 A * | 6/1985 | Feldsted | 406/25 |
| 4,552,203 A | 11/1985 | Chrysostome et al. | |
| 4,662,799 A * | 5/1987 | Paul et al. | 406/14 |
| 4,706,697 A * | 11/1987 | Bowen | 137/13 |
| 4,834,587 A * | 5/1989 | Crawley et al. | 406/23 |
| 5,053,203 A * | 10/1991 | Mauleon et al. | 422/144 |
| 5,150,729 A | 9/1992 | Frank et al. | |
| 5,363,812 A | 11/1994 | Belin et al. | |
| 5,749,684 A * | 5/1998 | Horn Feja | 406/141 |
| 6,015,539 A | 1/2000 | Schmidt et al. | |
| 6,494,645 B1 * | 12/2002 | Seitz et al. | 406/24 |
| 6,666,629 B2 | 12/2003 | Hirsch et al. | |
| 7,021,870 B2 * | 4/2006 | Gille et al. | 406/93 |
| 2005/0058516 A1 | 3/2005 | Gille et al. | |

FOREIGN PATENT DOCUMENTS

| | | |
|---|---|---|
| DE | 19629289 | 1/1998 |
| DE | 19916980 | 12/1999 |
| EP | 0488433 | 6/1992 |
| WO | WO-0128900 | 4/2001 |

* cited by examiner

Fig.3

METHOD AND APPARATUS FOR CONTROLLING A STREAM OF SOLIDS

CROSS REFERENCE TO PRIOR APPLICATIONS

This application is a U.S. National Phase application under 35 U.S.C. §371 of International Application No. PCT/EP2008/000490, filed on Jan. 23, 2008 and which claims benefit to German Patent Application No. 10 2007 009 758.3, filed on Feb. 27, 2007. The International Application was published in English on Sep. 4, 2008 as WO 2008/104250 A1 under PCT Article 21(2).

FIELD

The present invention relates to a method and an apparatus for controlling a stream of solids and in particular for controlling the level and/or the solids inventory in a solids tank, such as in a fluidized bed in a fluidized-bed tank, as well as the temperature and/or the mixing ratio in a mixing tank to which two streams of solids are supplied.

BACKGROUND

During the treatment of granular solids such as sulfidic zinc ore, iron ore, sponge iron or aluminumhydroxide, it is the object in many regions that the solids inventory, for example, the quantity and hence the vertical level of the solids in a fluidized bed, must be kept constant. There are various solutions to this object. On the one hand, a so-called aperture blocker or a discharge lance can be used. This is a mechanical solids valve in the form of a lance with a conical tip which fits into a corresponding conically shaped opening of the tank wall of the fluidized bed. By withdrawing or inserting the lance into the opening, the cross-section is increased or reduced, so that the outflow can be controlled. However, the same pressure exists on both sides of the solids outlet, because the aperture blocker can effect a pressure seal only in the completely closed condition. In general, this will be the pressure of the fluidized bed at the level of the solids outlet. If as a result of the switching of the process and/or the respective operating condition a differential pressure is obtained over the solids outlet, a deterioration of the control quality must be expected.

EP 0 488 433 B1 describes a control aperture blocker for opening and closing a gas passage is described in detail.

Such control aperture blockers function in practice, but they have their weaknesses and disadvantages. On the one hand, the control aperture blocker has mechanically moving parts, which are in contact with the solids. Therefore, it must be cooled by water cooling if the solids are hot. The flow rate of the cooling water and the temperature difference between forward flow and return flow must be monitored. Occasionally, a damage of the lance occurs. Water then escapes from the lance and, in the worst case, flows into the tank located below the same, which has a refractory lining, whereby said refractory lining can be damaged. In addition, the lance must be moved laterally, with the drive being located on the outside at ambient pressure, and excess pressure or negative pressure typically existing inside. For sealing purposes, a stuffing box is used. If this becomes leaky, hot solids probably will be discharged, which represents a safety hazard, or ambient air will enter, which can disturb the process. To adjust the stream of solids discharged via the aperture blocker, an exact adjustment is required between the tip of the lance and the nozzle stone acting like a valve seat. It should be considered here that after extended operating periods the high temperatures can effect a displacement of the refractory lining, so that this exact adjustment can get lost. It can also occur that after an extended period with closed aperture blocker, the solids are defluidized before the tip of the aperture blocker and do not move upon opening the aperture blocker. In many cases, a manually handled air lance, which is moved through another stuffing box, can then be used for poking and at the same time fluidizing the solids. The success or failure of such poking typically can be observed through an inspection glass. When the solids are hot enough to glow, something can be seen. But if they are cold, nothing can be seen and one is working blind, so to speak. In the case of hot solids, however, the inspection glass withstanding the high temperatures is very expensive. Moreover, with a control aperture blocker, a pressure seal cannot be realized via the control device. This can lead to gas/air flows through the nozzle stone, in the worst case also against the direction of the solids flow, whereby the solids flow can be limited or even be inhibited completely.

Alternatively, the level of the inventory in the fluidized bed can also be kept constant by a weir or a discharge opening disposed at a firmly defined distance from the distributor plate. This is frequently employed in stationary or bubble-forming fluidized beds. When the fluidized bed has a higher or lower pressure than the surroundings or a succeeding tank into which the solids flow, a pressure seal must yet be realized. For this purpose, so-called float chambers, siphons or star feeders can be employed.

A siphon for conveying fine-grained solids is described in DE 196 29 289 A1. The siphon consists of a conduit connected with a means for feeding the solids and an almost oppositely directed second conduit to which a further conduit is connected, in which the solids are conveyed under the influence of gravity. Into a region filled with fine-grained solids, a lance extends for fluidizing the solids. The apparatus is used for blocking the pressure in a fluidized bed with respect to the underflow of a recirculation cyclone and for recirculating the solids from the cyclone back to the fluidized bed. A specific control of the stream of solids is not possible. The supply of air merely serves to keep the solids in a fluid-like condition. In such a system, the solids level in the fluidized bed is not variable.

In the case of star feeders, the stream of solids and hence the solids level in the fluidized bed can be influenced by varying the rotational speed, and when new, a pressure seal can also be achieved. However, they are disadvantageous in so far as the rotating rotor is in direct contact with the solids, whereby wear occurs and tightness is endangered. In addition, the shaft of the rotating rotor must be sealed against the surroundings, because the drive is arranged on the outside.

A further disadvantage of all the aforementioned systems consists in that they only work in a downward direction, for example, the solids arrive at a level lower than the level in the fluidized bed.

U.S. Pat. No. 6,666,629 describes a method for conveying granular solids, by means of which height can also in principle be overcome. By means of a gaseous medium, the solids are conveyed from a first zone with a pressure of 4 to 16 bar through a descending conduit and via an ascending conduit to a second zone with a pressure lower than in the first zone by 3 to 15 bar. The inflow of the gaseous medium is effected through an upwardly directed nozzle at the point where the descending conduit opens into the ascending conduit. Moreover, additional gas is introduced into the descending conduit, which determines the stream of solids through the descending conduit.

WO 01/28900 A1 describes an apparatus in which solids are conducted through a downer to an ascending conduit, through which they are conveyed by means of fluidizing gas and then are withdrawn at the bottom upon deflection. By means of numerous gas supply conduits, the stream of solids is fluidized both in the descending conduit and in the riser along the entire length and is thereby conveyed by gravity like a fluid in communicating tubes.

US 2005/0058516 A1 describes an apparatus for the transport of fine-grained solids with a controlled flow rate, wherein the solids initially flow downwards through a downer as a result of gravity and then are transported to a riser via an inclined transfer conduit by injecting a secondary gas, in which riser air is introduced from below, in order to convey the particles to the top. The downer and the riser accordingly are not directly connected with each other. In the connecting piece, the solids are fluidized and supplied with secondary air. The conveying air in the riser is kept constant, whereas the control of the stream of solids is effected via the secondary air in the connecting piece.

The stream of solids discharged via the riser then can be supplied to a mixing tank in which it is mixed with another stream of solids. Such mixture, however, without use of a riser formed as described above, is described, for instance, in DE 195 42 309 A1. When producing alumina from aluminum hydroxide, a partial stream of the predried and only slightly preheated hydrate is passed by the furnace of a calcining plant and then mixed with the hot alumina from the furnace of the calcining plant. It is difficult, however, to precisely define the temperature in the mixing tank and the mixing ratio of alumina and aluminum hydroxide, as the mass flows can hardly be measured. This is why in practice a speed-variable star feeder mostly is used for the hydrate passed by the furnace, by means of which the temperature in the mixing tank is controlled. However, this involves the above-described typical disadvantages of the star feeder such as wear and decreasing tightness, so that a reliable pressure seal is almost impossible.

SUMMARY

An aspect of the present invention is to provide for a control of the solids level in the solids tank and of the temperature in a mixing tank by reliably controlling the stream of solids. An additional, alternative aspect is to provide a reliable pressure seal.

In an embodiment, the present invention provides a method for controlling at least one of a level of solids and an inventory of solids in a solids tank includes withdrawing a stream of solids from the solids tank via a downer. The stream of solids withdrawn from the solids tank is fluidized at a bottom of the downer by supplying a conveying gas so as to convey the withdrawn stream of solids upward via a riser branching off from the downer, a size of the conveyed stream of solids being adjusted by the supplying of the conveying gas. At least one of the level and the inventory of the solids in the solids tank is used as an adjustment variable of a control circuit and a volume flow of the conveying gas is used as an actuating variable of the control circuit.

BRIEF DESCRIPTION OF THE DRAWINGS

The present invention is described in greater detail below on the basis of embodiments and of the drawings in which.

DETAILED DESCRIPTION

In accordance with the present invention, a granular stream of solids is withdrawn from a solids tank, in particular a fluidized-bed tank, via a descending conduit (downer), which stream of solids is fluidized at the bottom of the downer by supplying a conveying gas and is transported to a higher level via an ascending conduit (riser) branching off from the downer, wherein the size of the stream of solids conveyed through the riser is controlled by supplying the conveying gas, wherein the level of the solids or the solids inventory in the solids tank is measured and used as a control variable of a control circuit, and wherein the volume flow of the conveying gas is used as an actuating variable of the control circuit.

In an embodiment of the present invention, the level of the solids or the solids inventory is determined by means of the pressure difference between the upper and the lower region of the solids tank, for example, the fluidized bed formed in the same. Alternatively, it is also possible to perform an ultrasonic measurement of the solids level or a weight measurement of the solids tank.

In a stationary fluidized bed, the fluidized solids bed behaves like a fluid and thus generates a hydrostatic pressure, which is proportional to the height of the fluidized bed. In the case of a circulating fluidized bed, a level is not defined, because the fluidized bed fills up the entire fluidized-bed reactor. The pressure difference then is proportional to the solids inventory of the fluidized-bed reactor. In accordance with the present invention, the pressure difference signal is utilized for actuating a control valve via a control circuit and thereby determine the supply of the conveying gas. If the pressure difference in the fluidized-bed tank becomes too large, the valve is opened more and the conveying gas flow is increased, so that the solids are removed from the fluidized bed and the level is decreasing again. If the level becomes too low, the pressure difference is decreasing and the conveying gas flow is reduced, which leads to a corresponding reduction of the solids mass flow in the riser and hence to an increase of the level in the fluidized bed. In this way, the retention time of the solids in the fluidized bed can also be controlled.

If the stream of solids is supplied to a mixing tank via the riser, the temperature and/or the mixing ratio in the mixing tank can be controlled by means of the present invention in that the temperature in the mixing tank is measured and that the measured temperature is used as a control variable for the supply of the fluidizing gas. In this case as well, the size of the stream of solids conveyed through the riser is controlled by the supply of the fluidizing gas. If the temperature in the mixing tank differs from a defined setpoint, the supply of the fluidizing gas is adjusted such that correspondingly more or less solids are conveyed through the riser and thereby the temperature in the mixing tank is again brought to the desired value. In contrast to the mass flows of the solids, the temperature can be measured, so that a reliable control is possible.

In an embodiment of the present invention, the pressure difference between the bottom and the top of the downer is kept smaller than the pressure loss corresponding to a fluidized downer. If, as likewise provided in accordance with the present invention, the pressure at the bottom of the downer is kept greater than the pressure at the top of the downer, the solids in the downer behave like a sinking bed with a porosity close to that of a fixed bed. Thus, a non-fluidized, traversed moving bed is present in the downer.

The pressure difference of the first downer, $\Delta P_D$, here is defined by $$\Delta P_D = \Delta P_R + P_{R,K} - P_0 - \Delta P_{WS,B} > 0 \quad (1)$$

Here, $\Delta P_R$ is the pressure loss over the riser, which depends on the conveying gas flow and the solids mass flow. As the supply of gas to the riser is varied, in order to realize a certain solids mass flow, a corresponding pressure loss is obtained here.

$P_{R,K}$ is the pressure at the top of the riser. In many cases, this pressure corresponds to ambient pressure, but it can vary, for instance, when the waste air extraction of a fluidizing channel is too strong and a negative pressure is generated. If a further process part is provided downstream of the riser, the pressure $P_{R,K}$ can also be much higher than the ambient pressure, for instance also higher than the pressure $P_0$.

In addition, the pressure $P_0$ in the free space of the attached fluidized bed must be considered, as well as the pressure $\Delta P_{WS,B}$, which is caused by the fluidized bed of the bed height $H_{WS,B}$ above the downer inlet. Both pressures are dependent on the plant behavior of the fluidized-bed tank or possibly further upstream apparatuses. Thus, the pressure difference $\Delta P_D$ over the downer is obtained automatically corresponding to the adjustment of the conveying gas flow. Moreover, this pressure difference should not become greater than the one obtained in the case of a fluidized downer. This would mean that the porosity in the downer would be reduced and the back pressure from the riser, or also from the fluidized-bed tank, no longer could be sealed reliably. This is expressed by:

$$\Delta P_D < \Delta P_{D,max} = (1 - \epsilon_{mf}) \cdot \rho_s \cdot g \cdot H_D \quad (2)$$

wherein
$\epsilon^{mf}$=porosity of the solids in the fixed-bed condition
$\rho_s$=solids density
g=gravitational acceleration
$H_D$=height of the riser.

Under these conditions, the bed in the downer acts as a pressure seal, and the pressure at the top of the riser is uncoupled from the pressure at the inlet of the downer. Furthermore, the solids mass flow conveyed or the bed height and the solids inventory in the fluidized-bed tank can now be adjusted or controlled by varying the conveying gas. The conveying gas, such as air, for the major part flows upwards in the riser and transports so much solids to the top as corresponds to its load-bearing capacity. A minor part of the conveying gas traverses the moving bed in the downer and thereby causes the pressure loss in the downer.

In principle, a positive or negative pressure difference can be overcome by the arrangement in accordance with the present invention, the pressure difference between the inlet of the downer and the top of the riser lying in the range from −10 bar to +50 bar, for example, from −1 bar to +1 bar, in accordance with the present invention. The pressure at the top of the riser is 0 to 50 bar (abs.) in accordance with the present invention, approximately ambient pressure can, for example, be used.

Below the riser, the conveying gas can, for example, be supplied via at least one conveying gas nozzle. For this purpose, in principle any suitable nozzle or gas supply can be provided, for instance, a cap-type nozzle or a nozzle directed upwards, at whose upper end, for example, a porous, gas-permeable medium such as a membrane can be disposed, which is traversed by the conveying gas flow, or for instance, a suitably mounted orifice plate.

In an embodiment of the present invention, the conveying gas can be supplied below the riser via at least one downwardly directed nozzle. A pluggage of the nozzle is therefby reliably avoided.

The required quantity of conveying gas depends on the solids properties, such as particle density, particle size and size distribution, the operating temperature and the operating pressure, the riser diameter and the riser height. The riser diameter can, for example, be chosen such that with the maximum solids mass flow to be expected a solids delivery rate of up to 5 m/s, for example, about 1 to 2 m/s is obtained.

The optimum height of the riser depends on the pressure at the riser head and on the solids density. It can, for example, be greater than the height of the downer, when the pressure at the riser head is smaller than/equal to the pressure at the inlet of the downer. When the pressure at the riser head is significantly higher than the pressure at the inlet of the downer, the length of the riser can be reduced. Then, it can even be smaller than the height of the downer.

In accordance with the present invention, the level of the fluidized bed in the fluidized-bed tank is kept constant, and this is also applicable when the solids mass flow at the entrance to the tank varies. It is likewise in accordance with the present invention to specifically vary the level of the fluidized bed with a constant inlet mass flow, for instance, following a linear increase and decrease or in cyclically recurrent form of any time function (level=f(time)), for example, corresponding to a sinusoidal function. For this purpose, the setpoint of the control circuit would only be varied correspondingly.

When different gas atmospheres are required in the fluidized-bed tank and the discharge tank of the riser, a gas barrier between the fluidized-bed tank and the discharge tank of the riser is ensured in accordance with the present invention, in that a third gas, for example an inert gas such as nitrogen, is used as conveying gas.

In accordance with a development of the present invention, the solids mass flow can reliably be interrupted by a strong reduction or complete interruption of the conveying gas flow. Experiments have shown that even with great pressure differences between the fluidized-bed tank and the head of the riser, the solids will cease to flow as soon as the conveying gas flow becomes smaller than would be necessary for a minimum fluidization in the riser. Both in the downer and in the riser, a traversed fixed bed then is obtained. Thus, when the conveying gas flow is not interrupted completely, but only reduced below the critical limit, and a third gas, for example an inert gas, is chosen as conveying gas, this traversal guarantees the separation of the gas atmospheres between the fluidized-bed tank and the riser head also in the case of the interrupted stream of solids, which may be necessary depending on the application. When the conveying gas flow is interrupted completely, the solids in the downer and in the riser will remain as a fixed bed. Through the downer and the riser, a very small gas flow may then occur from the tank with the higher pressure into the tank with the lower pressure.

Due to the dependence of the conveyed solids mass flow on the conveying gas volume flow and the material used, the mass flow of conveyed solids can be determined at the same time, and an indirect measurement of the conveyed solids mass flow through the riser is possible in accordance with the present invention.

In principle, all fluidizable solids can be transported with the arrangement in accordance with the present invention. In general, however, the particle size of the solids to be conveyed should not be greater than 10 mm, for example, not greater than 3 mm or not greater than 0.3 mm. Iron ore is processed for instance with a grain size up to about 10 mm, plastics granules have a grain size of, for example, 2 to 6 mm, whereas alumina is processed with a grain size of, for example, <0.3 mm.

In an embodiment of the present invention, several streams of solids are withdrawn from the fluidized-bed tank in parallel via separate downers. In accordance with the present invention, the supply of conveying gas for each downer and hence the discharge of solids via the respectively associated riser is varied individually. In this way, several variables can then be controlled. For instance, in the case of four separate downers, the level in the fluidized-bed tank can be controlled on the one hand by varying the supply of conveying gas to the first riser, whereas in the discharge tanks of the second, third and fourth riser three levels and/or mixing temperatures are controlled. All riser diameters can be different and all riser heads can be located at different levels and have different pressures. Moreover, the inlets of the various downers can also be connected to the fluidized-bed tank at different levels, which permits, for instance, a substantial evacuation of the fluidized-bed tank through the bottommost downer. The pressures at the riser heads can also be different from the pressure at the inlet of the downers. In addition, the gas atmospheres in the fluidized-bed tank and in the four discharge tanks can be different, and gas barriers are possible between all five tanks. Here, it is also possible to normally not utilize one or more of the downers and only use the same as an additional conveying means when a critical solids level in the fluidized-bed tank is exceeded. Switching between various recipient tanks for the solids discharged from the fluidized bed so far has merely been possible via a mechanical switch. By means of the present invention, the contact of movable parts with the hot solids is avoided and the resulting wear, which leads to a reduction of the control accuracy and an increased maintenance effort, is avoided.

This present invention also extends to an apparatus for controlling the stream of solids.

When controlling the level and/or the solids inventory in a solids tank, for example, in a fluidized bed, a measuring device for detecting the level of the solids in the tank is provided in accordance with the present invention, wherein the supply of the conveying gas flow to the associated riser is effected via a control valve, and wherein the open position of the control valve can be varied via a control circuit on the basis of the measurement result of the measuring device.

In the case of fluidized beds, the level can, for example, be detected by means of the pressure difference between the deepest point of the fluidized bed and the free space above the fluidized bed. The pressure difference can be measured directly via a differential pressure pickup. Alternatively, the pressure difference can also be calculated on the basis of the measurement of two pressure sensors. However, the solids inventory can, for instance, also be detected by weighing the solids tank or by measuring the deformation of a supporting steel scaffold.

For controlling the temperature and/or the mixing ratio of two streams of solids joined together in one mixing tank, a temperature measuring device is provided at the mixing tank in accordance with the present invention, wherein the supply of the conveying gas flow is effected via a control valve and the open position of the control valve can be controlled via a control circuit on the basis of the temperature measured by means of the temperature measuring device.

In accordance with the present invention, the supply of the conveying gas flow is effected via at least one nozzle, for example a downwardly inclined nozzle. Alternatively, the supply of the conveying gas flow can also be effected via a fluidizing cloth or some other porous medium.

In accordance with the present invention, the downer is inclined by not more than 45° with respect to the vertical in order to provide for the solids descending gradually in the downer without fluidization.

On the other hand, the riser can, for example, be arranged approximately vertical. The discharge of solids through the riser is thereby facilitated.

In an embodiment of the present invention, the height of the riser is greater than the height of the downer. Thus, height can also be gained by means of the present invention, for example, the solids can be conveyed to the top. In plant construction, this is highly advantageous because the various process stages no longer must be built one on top of the other, but can also be erected one beside the other. In this way, construction height and hence costs are saved.

To be able to adjust the desired flow regime in the riser, which is very similar to that of a dense fluidized bed, the diameter of the downer should be greater than or equal to the diameter of the riser. The diameter of the downer can, for example, be 1.5 to 3 times the diameter of the riser; usually it should be twice as great as the diameter of the riser. It is not necessary that downers or risers always are cylindrical. Oval, angular etc. embodiments are also possible. The diameter then always refers to an equivalent diameter of a round tube with the same cross-sectional area. It is also possible that the diameters or shapes of the downers and risers are changing along their course.

At its upper end, the riser opens into a discharge pot or expansion tank, from which the solids then are withdrawn. Alternatively, the solids can also simply be deflected via an elbow at the upper end of the riser and then be conducted into a recipient tank.

In accordance with the present invention, the temperature of the solids in the downer and/or riser can be influenced in that heat exchangers are provided in the downer and/or in the riser. In the case of inside heat exchangers, the diameter of the riser can be adjusted such that the ratios of free cross-sectional area between downer and riser again correspond to the required relations. Alternatively, the downer and/or the riser itself can also constitute a heat exchanger.

If two or more downers branch off from the fluidized-bed tank, the solids can be supplied in parallel to various downstream tanks or plants. The flow rate through the individual downers and associated risers can be controlled individually. The risers also can have different lengths. When the risers are designed for different streams of solids, the diameters can be adjusted correspondingly. Furthermore, it is not necessary that the downers or risers are always cylindrical. Oval, angular, etc. embodiments are, for example, also possible. The diameter then always refers to an equivalent diameter of a round tube with the same cross-sectional area. It is also possible that the diameters or shapes of the downers and risers are changing along their course.

Figure 1:
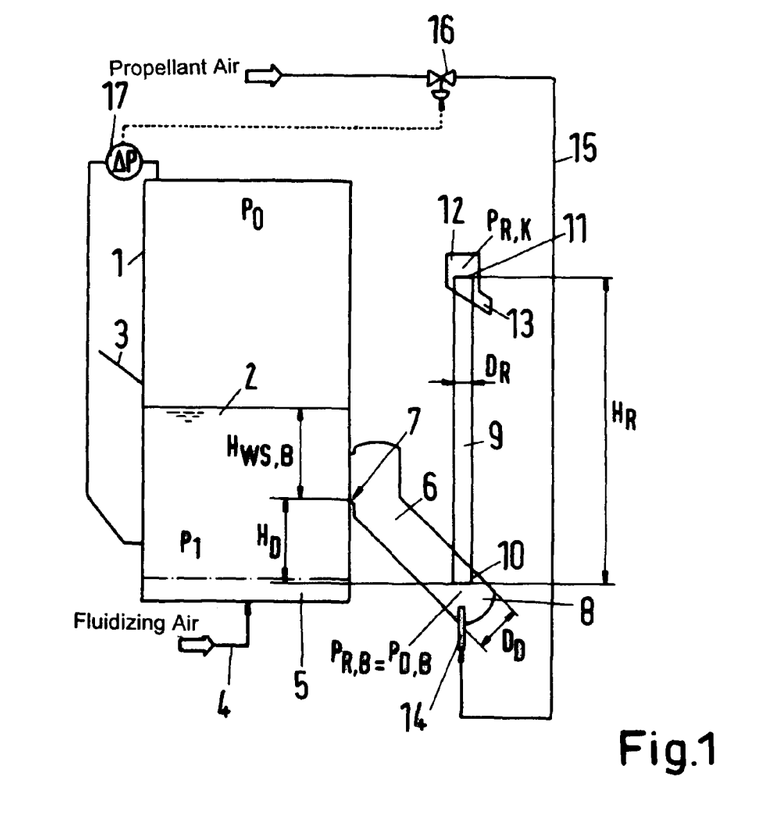
FIG. 1 schematically shows an apparatus in accordance with a first embodiment of the invention, FIG. 2 schematically shows an apparatus in accordance with a second embodiment of the invention, and FIG. 3 schematically shows an apparatus in accordance with a third embodiment of the present invention.

FIG. 1 shows an apparatus for adjusting the level or the inventory in a fluidized-bed tank 1 in accordance with a first embodiment of the present invention. Instead of the fluidized-bed tank 1, there can also be used a cyclone or some other tank containing solids. What is important is that fluidizable solids are received in the tank.

In the fluidized-bed tank 1, there is shown a stationary (bubble-forming) fluidized bed 2 of, for example, fine-grained solids, such as iron ore, alumina or plastics granules, with a mean grain size below 10 mm, for example, from 0.01 to 5 mm or from 0.05 to 1 mm. The solids are introduced into the fluidized-bed tank 1 via a supply conduit 3. The fluidized bed 2 is fluidized by means of fluidizing gas, which is supplied to a gas distributor 5 via a conduit 4 and traverses the fluidized bed 2 from below. In addition, fuel can be supplied.

At a defined distance from the distributor plate (i.e. above the same or at its level), a descending conduit, which is also referred to as downpipe 6 or downer, branches off from the fluidized-bed tank 1. The inlet region of the downer 6 located above the height $H_D$ is also referred to as head 7 of the downer. Shortly before the bottom 8 of the downer 6, an upwardly directed conduit, which is also referred to as rising pipe 9 or riser, branches off from the downer 6 and extends substantially vertically to the top. The diameter of the downer 6 is about twice as great as that of the riser 9. The inlet region or base 10 of the riser 9 can slightly protrude into the downer 6 or terminate flush with the wall of the downer 6. At the upper end or head 11 of the riser 9, the riser 9 opens into a discharge pot 12, from which the solids can flow off via a chute 13. This downer/riser arrangement is also referred to as "Lifting Sealpot" (LSP).

At the bottom 8 of the downer 6, below the riser base 10, conveying gas is supplied via a nozzle 14 connected to a supply conduit 15, in order to fluidize the stream of solids in the riser 9. In principle, any suitable conveying gas can be used as fluidizing gas. A third gas, for example, an inert gas such as nitrogen can be used to ensure the separation of the gas atmospheres between the fluidized bed and the head of the riser. For the sake of simplicity, the conveying gas subsequently will briefly be referred to as propellant air. A plurality of nozzles 14 can be provided to supply the propellant air. The nozzle 14 is not restricted to the illustrated form of an upwardly directed nozzle. Rather, it is also possible to provide a cap-type nozzle or a downwardly directed nozzle or a nozzle with a porous body provided at its end, which should prevent the nozzle from plugging. It is also possible to supply the conveying gas via a fluidizing cloth or some other porous medium, which is disposed at the bottom of the downer above a non-illustrated gas distributor. One of skill in the art can employ all measures known to him for appropriately fluidizing the solids at the bottom of the downer 6.

The supply conduit 15 for the propellant air includes a control valve 16, by means of which the supplied quantity of propellant air can be controlled. For this purpose, a pressure difference measuring device 17 is provided at the fluidized-bed tank 1, by means of which the pressure difference ΔP between the pressure $P_0$ over the fluidized bed 2 and the pressure $P_1$ in the fluidized bed 2 below the inlet region of the downer 6 is measured. The pressure $P_1$ can be measured, for example, at the lower end of the fluidized bed 2 directly above the distributor plate of the gas distributor 5. The pressure difference ΔP is provided to the control valve 16 as a control variable for controlling the supply of propellant air.

The apparatus in accordance with an embodiment of the present invention is designed substantially as described above. Subsequently, the mode of function and operation of this apparatus will be explained.

From the fluidized bed 2 in the fluidized-bed tank 1, the solids sink through the downer 6 to the bottom 8 of the downer 6 and to the lower end 10 of the riser 9. By adding propellant or conveying air below the inlet opening 10 of the riser 9, the solids are conveyed to the top in the riser 9, exit again at the upper end 11 thereof and flow off via the chute 13, for instance onto a conveyor belt, into a fluidizing channel, an airlift or the like. The stream of solids to be conveyed can be varied via the quantity of propellant air.

For controlling the bed height $H_{WS,B}$ in the fluidized-bed tank 1, the level of the fluidized bed 2 is measured via a pressure difference ΔP between the pressure $P_0$ above the fluidized bed and the pressure $P_1$ in the lower region of the fluidized bed. On the basis of the pressure difference ΔP, the control valve 16 is actuated, in order to define the quantity of propellant air to be supplied through the nozzle 14. The solids at the bottom of the downer 6 are fluidized by the propellant air and conveyed to the top through the riser 9. The flow in the riser 9 behaves like a dense fluidized bed, whereas the solids in the downer 6 are sinking like a traversed moving bed as a layer with a porosity close to that of a fixed bed. For this purpose, the solids flow rate in the downer 6 should not become too high and the pressure difference between the bottom 8 and the head 7 of the downer 6 should not become greater than the pressure loss corresponding to a fluidized downer 6. At the same time, the pressure at the bottom of the downer 6, which corresponds to the pressure at the lower end of the riser 9, should be greater than the pressure at the top of the downer 6.

In many cases, the pressure $P_{R,K}$ at the head 11 of the riser 9 corresponds to ambient pressure. However, conveyance in the riser 9 is also possible against a high excess pressure, for instance, up to 50 bar, or also against a negative pressure.

For keeping constant the level in the fluidized-bed tank 1, the supply of conveying air is controlled via a control circuit. The level is detected via a measurement or calculation of the pressure difference $P_1-P_0$. In a fluidized bed, the fluidized solids bed behaves like a fluid and thus generates a hydrostatic pressure, which is proportional to the height of the fluidized bed. The pressure difference signal is utilized for actuating the control valve 16 via a control circuit, in order to keep the pressure difference $P_1-P_0$ constant. When the pressure difference $P_1-P_0$ in the fluidized-bed tank 1 becomes too large, the control valve 16 is opened more and the conveying gas flow is increased, so that more solids are removed from the fluidized bed 2 and the level decreases again. When the level of the fluidized bed 2 becomes too low, the pressure difference $P_1-P_0$ decreases and the conveying gas flow is reduced, which leads to a reduction of the solids mass flow in the riser 9, whereby the level increases again.

Thus, the bed height in the fluidized-bed tank can also be kept constant when the solids mass flow at the inlet of the fluidized-bed tank 1 varies. With constant inlet mass flow it is possible to specifically vary the bed height of the fluidized bed 2, for instance, as a sinusoidal function over time. For this purpose, the setpoint of the control circuit is varied correspondingly.

By means of the apparatus in accordance with the present invention, the solids mass flow can also be reliably interrupted. This is effected by a strong reduction or complete interruption of the conveying gas flow. Even with great pressure differences between the fluidized-bed tank 1 and the head 11 of the riser 9, the solids will cease to flow, as soon as the conveying gas flow becomes smaller than corresponds to the minimum fluidization rate in the riser 9. In the riser 9 and in the downer 6 a traversed fixed bed then is obtained. This traversal guarantees the separation of the gas atmospheres between the fluidized-bed tank 2 and the head 11 of the riser 9, which may be necessary depending on the application. When the conveying gas flow is interrupted completely, the solids will remain in the riser 9 as a fixed bed and prevent the compensation of pressure between the fluidized-bed tank 1 and the head 11 of the riser 9.

The solids mass flow in the riser 9, whose conveying gas volume flow is connected as an actuating variable for controlling the solids inventory of the fluidized-bed reactor 1, is in a defined relationship with the conveying gas volume flow itself. If a flow measurement for the conveying gas is employed before the control valve 16, the solids mass flow therefore can be derived from the measured conveying gas volume flow. The solids retention time of a solids tank, for instance, also of a fluidized-bed reactor, is obtained from the ratio of solids content to solids throughput. Because the solids mass flow of the riser 9—apart from control variations—is identical with the solids throughput of the fluidized-bed reactor, the solids retention time can even be determined and controlled in the method of the present invention. When the usually constant introduction of solids into the fluidized-bed reactor is, for example, doubled at a specific time, the inventory in the fluidized-bed reactor should also be doubled, if the solids retention time should be kept constant. Even if the introduction of solids into the fluidized-bed reactor is not measured, it can be concluded from the rise in the solids mass flow in the riser 9 that the throughput of the system has been doubled. For keeping constant the solids retention time, the setpoint of the control circuit for the reactor inventory then is doubled. After a transition period, twice the pressure difference of the fluidized-bed reactor is obtained. Thus, instead of the solids inventory in the fluidized bed, even the retention time of the solids in the fluidized bed can be controlled in this way.

Figure 2:
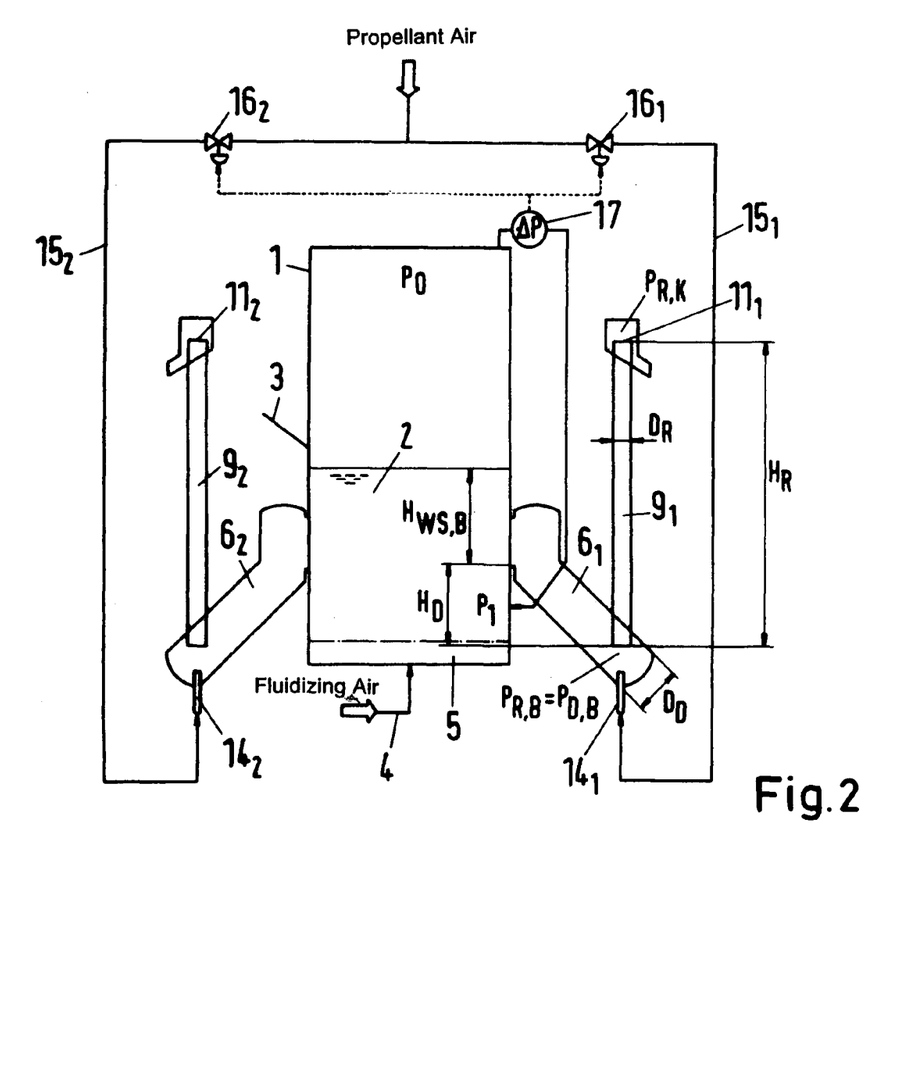

FIG. 2 shows a second embodiment of the present invention, in which two downers $6_1$ and $6_2$ are connected to the fluidized-bed tank 1. Here, the function is just the same as in the apparatus as shown in FIG. 1, so that reference is made to the above description. Of course, it is also possible to provide further downers $6_3$ to $6_n$. In the embodiment as shown in FIG. 2, the supply of conveying gas via the nozzles $14_1$, $14_2$ for each downer $6_1$ $6_2$ is varied individually by correspondingly actuating the control valves $16_1$, $16_2$. As a result, the stream of solids through the risers $9_1$, $9_2$ likewise can be varied individually. It must merely be ensured that the height of the fluidized bed 2 does not decrease below the inlet of the downers $6_1$, $6_2$. Of course, it is also possible to provide further downers $6_3$ to $6_n$ with associated risers $9_3$ to $9_n$, for which then the same applies. These individually adjustable streams of solids through n independent downers and associated risers can then be utilized for controlling n variables, for instance n temperatures in the n tanks connected to the rising head pipes $11_1$ to $11_n$, when one further stream of solids of different temperature is each introduced into these tanks. It is likewise possible to control the level of the fluidized bed in the fluidized-bed tank 1 by varying the streams of solids through the riser $9_1$, while n−1 temperatures in the tanks behind the rising head pipes $11_2$ to $11_n$ are controlled by varying the streams of solids in the risers $9_2$ to $9_n$. Another possibility is the control of n solids levels in the tanks behind the riser heads $11_2$ to $11_n$, when the level in the fluidized bed is controlled by varying the stream of solids through the solids inlet 3. It can thus be obtained, for instance, that in these tanks, which all have different pressures and gas atmospheres and can be located at different heights, enough solids for the supply of downstream apparatuses or parts of the plant always are available.

Figure 3:
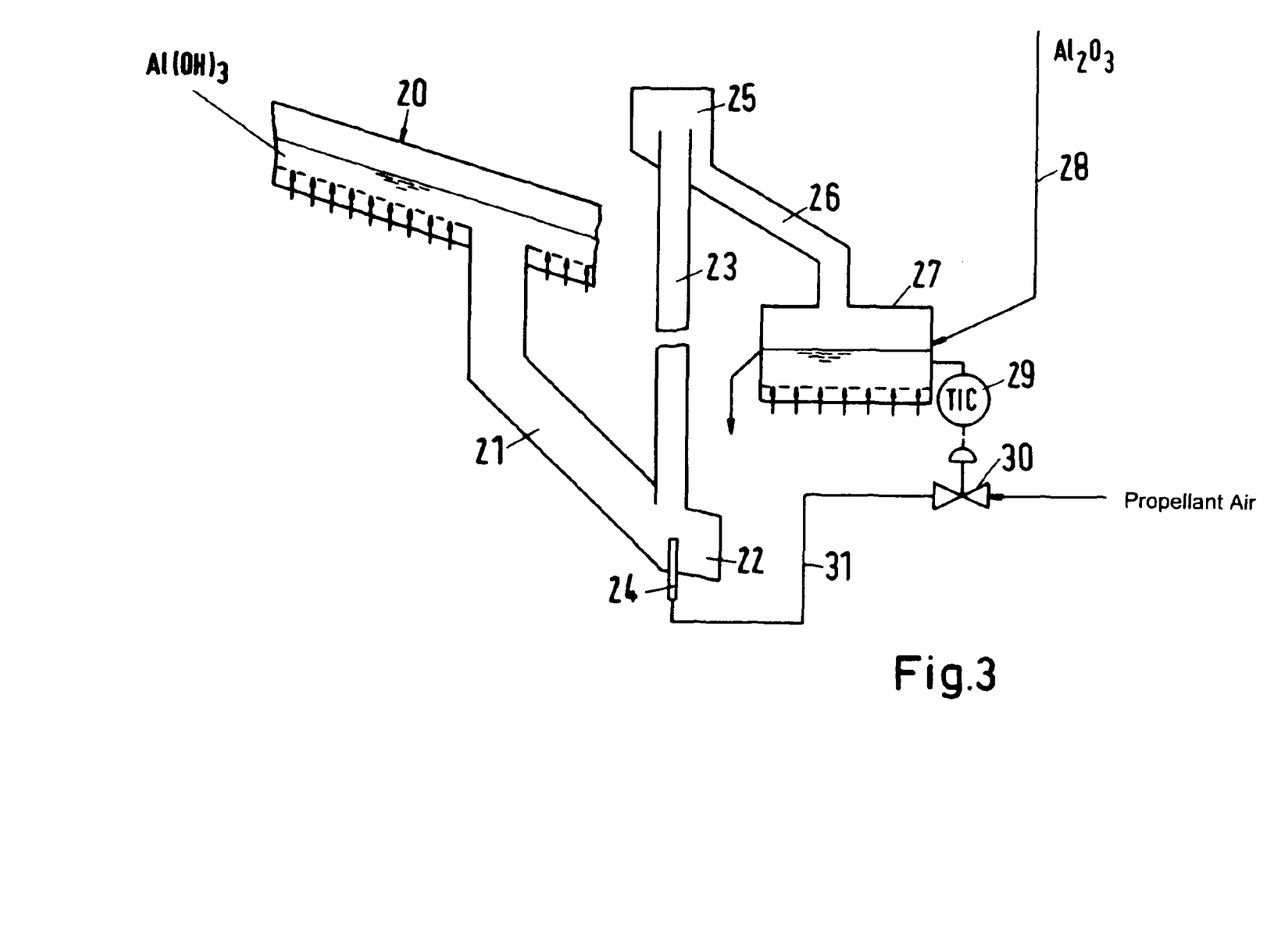

FIG. 3 shows a third embodiment of the present invention, in which the apparatus of the present invention is used for a hydrate bypass during the production of alumina.

A method for producing alumina from aluminum hydroxide is described, for instance, in DE 195 42 309 A1. A partial stream of moderately warm aluminum hydroxide ($Al(OH)_3$) is branched off before the calcining furnace and later on admixed again to the hot alumina ($Al_2O_3$) produced in the calcining furnace. In the illustrated embodiment, the aluminum hydroxide branched off is conveyed via a fluidizing channel 20 at a temperature of about 160° C. and at about ambient pressure. From the fluidizing channel 20, part of the aluminum hydroxide flows off via a downer 21, while the other part is moved on in the fluidizing channel 20 and is supplied to the calcining furnace via various non-illustrated process stages. Like in the first embodiment, a riser 23, which extends to the top substantially vertically, branches off at the bottom 22 of the downer 21. The solids at the bottom of the downer 21 are fluidized by means of at least one nozzle 24, which in turn can be any nozzle in principle. There is shown an upwardly directed nozzle 24, but it is also possible to direct the nozzle downwards, in order to be able to prevent pluggings more reliably. The solids ascend through the riser 23 into an expansion tank 25 and are supplied from the same via a delivery conduit 26 to a mixing tank 27. Instead of the expansion tank 25, a simple elbow can also be provided at the end of the riser 23.

In the mixing tank 27, the aluminum hydroxide is mixed with alumina from the calcining furnace, which is supplied via a conduit 28. The alumina has a temperature of about 970° C., so that with the mixing ratio provided in the fluidized mixing tank 27 a mixing temperature of about 850° C. is obtained. The pressure in the mixing tank 27 is about 1.14 bar (abs), i.e. there exists a slight excess pressure with respect to the surroundings. In this embodiment, the mixing tank 27 can be disposed above or below the fluidizing channel 20.

The temperature in the mixing tank 27 depends on the mixing ratio between the aluminum hydroxide supplied via the riser 23 and the alumina supplied via the conduit 28 and on the temperatures of these streams of solids. The solids mass flows in the riser 23 and in the conduit 28 can, however, hardly be measured. Therefore, it is provided in accordance with the present invention to detect the easily measurable temperature in the mixing tank 27 by means of a temperature measuring device 29 and use the same as a control variable for actuating a control valve 30 in the supply conduit 31 to the nozzle 24, by means of which the supply of the conveying gas at the bottom 22 of the downer 21 is adjusted. In this way, the mixing ratio and hence the temperature in the mixing tank 27 can be influenced by increasing the supply of conveying gas via the nozzle 24 when the actual temperature in the mixing tank 27 exceeds the setpoint, so that more colder aluminumhydroxide is introduced into the mixing tank. As a result, the temperature in the mixing tank decreases again. When the temperature in the mixing tank 27 decreases below the setpoint, the supply of aluminumhydroxide is reduced by correspondingly closing the control valve 30.

By means of the present invention, a simple control of the level and/or the solids inventory in the fluidized bed in a fluidized-bed tank and of the temperature and the mixing ratio in a mixing tank can thus be achieved. At the same time, a pressure seal between the fluidized bed contained in the fluidized-bed tank and the head of the riser is obtained, which is important in many applications. Finally, it is also possible to reduce the amount of solids conveyed through the riser to zero by means of the arrangement in accordance with the present invention.

EXAMPLES

Discharge of Iron Ore

During discharge from a fluidized-bed cooler for iron ore, a system as shown in FIG. 1 is utilized. The entrance to the downer 6 is located about 0.5 m below the desired level of the fluidized bed. The inflow into the cooler is specified and should again be discharged continuously via the downer/riser arrangement (Lifting Sealpot or LSP), in order to keep the level in the cooler constant. The downer 6 has a diameter $D_D$=0.2 m and a downer height $H_D$=2 m. The riser 9 with a diameter $D_R$=0.1 m has a length $H_R$=4 m. Thus, the riser head is located about 1.5 m above the desired level in the fluidized-bed tank. The excess pressure above the fluidized bed is about 30 mbar, while ambient pressure exists at the riser head.

The level of the fluidized bed is measured via a pressure difference as in FIG. 1 and controlled via a control circuit and the control valve 16 for the conveying air flow. The conveying air is provided by a blower and supplied via an upwardly directed nozzle 14 below the riser bottom 10. With a solids flow rate of 6.2 t/h, the conveying gas flow is about 40 Nm³/h. As the plant can also be operated under partial load or overload, the conveying gas flow then is decreased or increased correspondingly, in order to keep the level in the fluidized bed constant.

When it is desired, for instance, to discharge as much iron ore as possible from the cooler before shutting off the plant, the setpoint of the control circuit can also be changed to a level lower than usual with the consequence that more iron ore is discharged from the cooler via the LSP, until the new level setpoint is reached.

Conversely, when discharge is disturbed behind the riser head, the level setpoint in the cooler can be increased for a certain period. Then, less or no iron ore at all would be discharged from the cooler by the LSP, with the consequence that the level in the cooler is rising and ore is stored there specifically.

Hydrate by-Pass

Here, the present invention is utilized to pass a part of the hydrate stream by the furnace of a calcining plant, as described in principle in DE 195 42 309 A1 (cf. FIG. 3). For this purpose, a partial stream of the preheated and predried hydrate is withdrawn such that the downer 21 of the present invention always is completely filled. The solids then are conveyed via the riser 23 into the mixing tank 27 (Mixpot), where they are processed.

The downer 21 has a diameter $D_D$=0.2 m and a downer height $H_D$=8 m. At its base, the riser with a diameter $D_R$=0.1 m is connected flush with the downer 21. The riser 23 has a length $H_R$=10 m. Thus, the riser head is located about 2 m above the level in the fluidizing channel. The pressure in the fluidizing channel is about ambient pressure, whereas the pressure at the riser head corresponds to the pressure in the mixing tank with an excess pressure of 0.14 bar.

The solids flow rate is varied here between 0 and 10 t/h, so that the temperature in the mixing tank, where the solids conveyed are mixed with hot solids from the furnace, is kept at a constant setpoint. In this case, the control variable thus is the temperature in the mixing tank. This temperature is determined by the mass flow ratio of hydrate, which flows into the mixing tank through the hydrate by-pass, and alumina, which flows from the furnace into the mixing tank. The control circuit actuates the control valve 30 for the conveying air of the LSP, because neither the alumina mass flow from the furnace nor the hydrate mass flow through the hydrate by-pass can easily be measured. On the other hand, the temperature measurement in the mixing tank can be effected. For a mixing tank temperature of 850° C. a hydrate mass flow of about 8 t/h is required through the by-pass, when the total production of alumina is 78 t/h. For this purpose, about 120 Nm³/h of conveying air are required in the LSP.

The present invention is not limited to embodiments described herein; reference should be had to the appended claims.

LIST OF REFERENCE NUMERALS 1 fluidized-bed tank
2 fluidized bed
3 solids supply conduit
4 supply conduit fluidizing gas for fluidized bed
5 gas distributor
6 downer
7 head of the downer
8 bottom of the downer
9 riser
10 bottom of the riser
11 head of the riser
12 discharge pot
13 chute
14 nozzle
15 conduit
16 control valve
17 pressure difference measuring device
20 fluidizing channel
21 downer
22 bottom
23 riser
24 nozzle
25 expansion tank
26 delivery conduit
27 mixing tank
28 conduit
29 temperature measuring device
30 control valve
31 supply conduit

The invention claimed is:

1. A method for controlling at least one of a level of solids and an inventory of solids in a solids tank, the method comprising:
withdrawing a stream of solids from the enclosed solids tank via a downer;
fluidizing the stream of solids withdrawn from the solids tank at a bottom of the downer by supplying a conveying gas so as to convey the withdrawn stream of solids upward via a riser branching off from the downer;
providing a control circuit configured to adjust a supply of the conveying gas; and
measuring at least one of the level and the inventory of the solids in the solids tank and using the measurement as a control variable of the control circuit so as to increase or decrease a volume flow of the conveying gas and thereby adjust a size of the stream of solids being conveyed up the riser.

2. The method as recited in claim 1, wherein the solids tank is a fluidized-bed tank.

3. The method as recited in claim 1, wherein the level of the solids in the solids tank is measured by measuring a pressure difference between an upper region and a lower region of the solids tank.

4. The method as recited in claim 1, further comprising maintaining a pressure difference between the bottom and a top of the downer below a pressure loss of a fluidized downer.

5. The method as recited in claim 1, further comprising maintaining a pressure difference between an inlet of the downer and a head of the riser at from −10 bar to +50 bar.

6. The method as recited in claim 1, further comprising maintaining a pressure at a head of a riser at from 0 to 50 bar (abs).

7. The method as recited in claim 1, further comprising a delivery rate in the riser being smaller than 5 m/s.

8. The method as recited in claim 2, further comprising varying a bed height of a fluidized bed in the fluidized-bed tank corresponding to a specified function.

9. The method as recited in claim 1, wherein the conveying gas includes an inert gas.

10. The method as recited in claim 1, further comprising interrupting a throughput of the solids by supplying the conveying gas with a volume flow rate that is below a critical limit necessary for a minimum fluidization in the riser.

11. The method as recited in claim 1, wherein a particle size of the solids to be conveyed is not greater than 10 mm.

12. The method as recited in claim 1, further comprising providing a control valve that is not in mechanical contact with the solids and which is actuated via the control circuit, wherein an open position of the control valve is varied using the control variable.

* * * * *